May 8, 1951  F. H. KIRCHNER  2,551,842
BEVERAGE DISPENSING APPARATUS
Filed May 21, 1946  2 Sheets-Sheet 1

INVENTOR.
Franklin H. Kirchner
BY Popp & Popp
Attorneys.

May 8, 1951  F. H. KIRCHNER  2,551,842
BEVERAGE DISPENSING APPARATUS

Filed May 21, 1946  2 Sheets-Sheet 2

INVENTOR.
Franklin H. Kirchner
BY Pope & Pope
Attorneys.

Patented May 8, 1951

2,551,842

UNITED STATES PATENT OFFICE 2,551,842

BEVERAGE DISPENSING APPARATUS

Franklin H. Kirchner, Buffalo, N. Y.

Application May 21, 1946, Serial No. 671,309

5 Claims. (Cl. 225—21)

This invention relates to a liquid dispensing apparatus which is more particularly intended for dispensing beverages containing solid matter such as orange juice, tomato juice and the like.

These liquids when stored in bulk are liable to vary considerably in the distribution of the solids throughout the mass due to precipitation of the solids if the intervals between successive withdrawals of liquid from the container are comparatively long. It has therefore been found necessary heretofore to stir such liquids occasionally so that the solids in the same are uniformly distributed when dispensed.

This stirring has heretofore usually been effected either manually or by mechanical means, but in the present invention it is proposed to accomplish this purpose by causing air which replenishes the liquid in the container to also serve as the means for agitating the liquid and thereby cause the solids therein to be distributed automatically throughout the mixture.

It is the object of this invention to provide a liquid dispensing apparatus with air agitating means which are simple in construction, efficient in operation and permit of refilling the container without removing the same from the apparatus.

Figure 1:
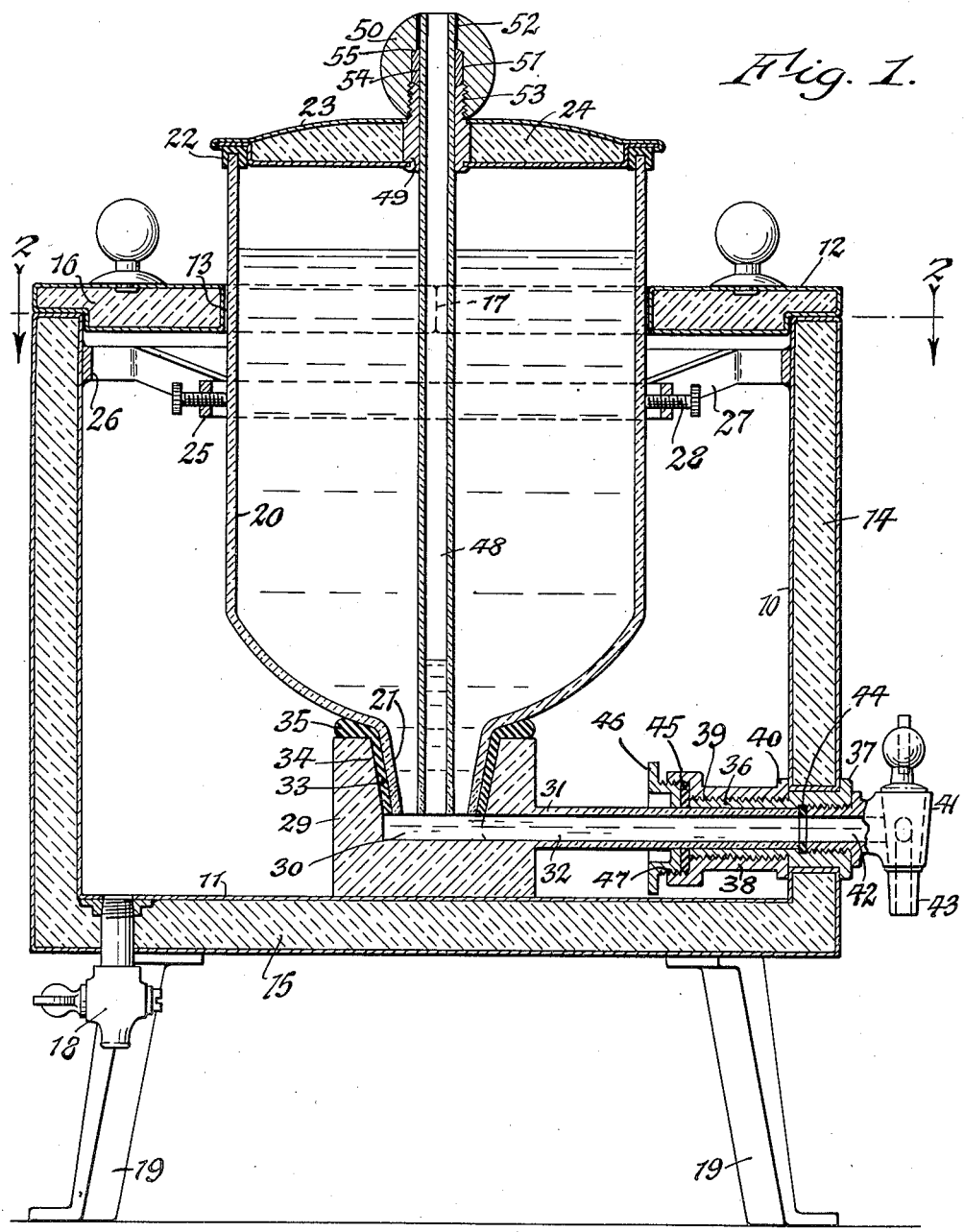

In the accompanying drawings Fig. 1 is a vertical section of an apparatus embodying this invention.

Figure 2:
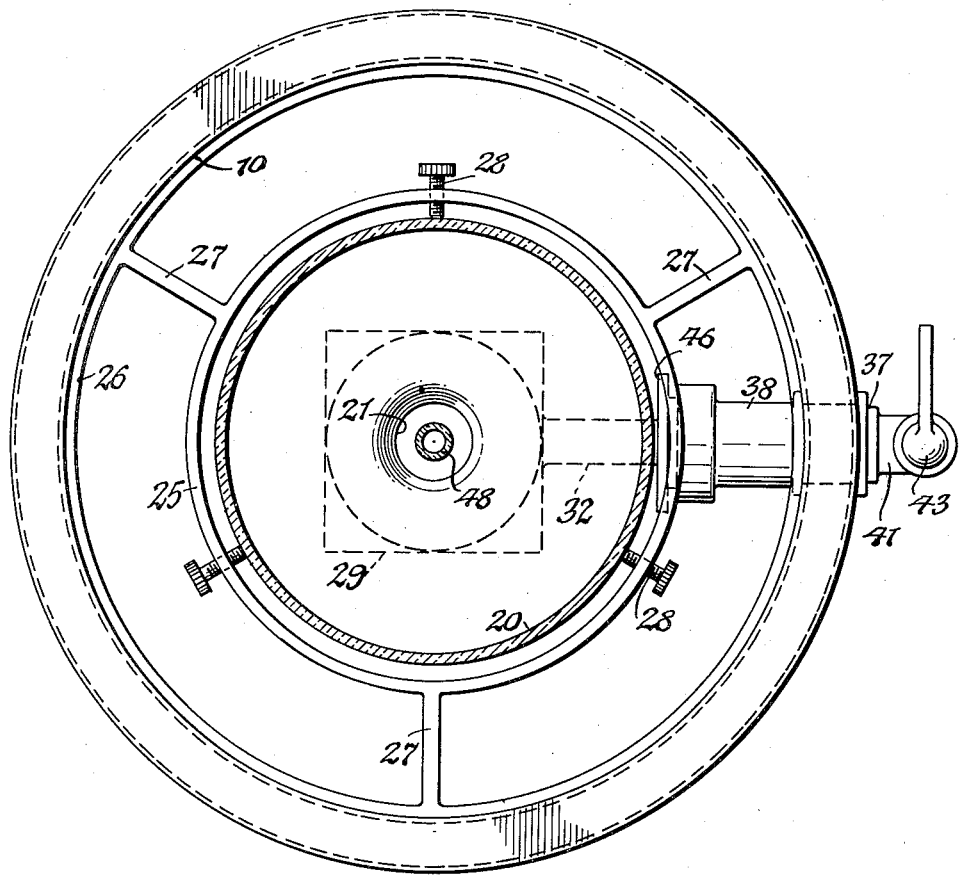

Fig. 2 is a horizontal section taken on line 2—2, Fig. 1, looking downwardly.

In the following description similar characters of reference indicate like parts in both figures of the drawings.

In its general organization this apparatus comprises a container which is adapted to hold the solids bearing liquid to be dispensed such as orange juice, tomato juice and the like, means for supporting this container and keeping the contents cool preparatory to serving a customer, means for supplying air to the container for agitating the liquid therein and also replacing the liquid drawn from the container, and valve controlled means whereby liquid is withdrawn from the lower end of the container for delivery to a customer.

Although the cooling means of this apparatus may be variously constructed the same preferably includes a tank comprising a body and has an upright wall 10 and a horizontal bottom 11 which is open at the top, and a lid 12 which is adapted to rest at its edge on the upper end of the tank wall and is provided centrally with an opening 13 for the reception of the container which holds the liquid to be dispensed. In the preferred construction the side wall and bottom of this cooling tank are provided with jackets or linings 14, 15 of any suitable heat insulating material, and the lid is also provided with a jacket or lining 16 of heat insulating material for the purpose of protecting the ice which is placed in this tank and preventing the same from melting too rapidly. The lid of this tank is preferably divided diametrically at 17 into two sections so as to permit of readily placing the same around the liquid container and on the upper end of the tank wall as well as removing the same therefrom when the ice in the tank requires replenishing.

As the ice melts in the tank the liquid resulting therefrom may be withdrawn from time to time by a drain valve 18 connected with the bottom of this tank, as shown in Fig. 1.

On its underside this tank is provided with suitable legs 19 whereby the same may be supported upon a counter, table or other support.

The container which is adapted to hold the liquid mixture or beverage which is to be dispensed is preferably constructed of glass or other transparent material so as to form an upright cylindrical body 20 which is arranged within the opening 13 in the lid of the tank and has its upper part projecting above the top of the tank lid while its lower part is arranged within the tank and contacts the ice in the latter for cooling the liquid contents of the container.

The body of the container is comparatively large in diameter and its lower end is provided with a downwardly tapering hollow neck 21 which is of reduced diameter and is open at its lower end. The upper end of the body of the container is open across its entire diameter and is provided at the upper edge of its side wall with an annular rim of rubber 22 which is channel shaped in cross section and is fitted on the upper edge of the container body.

Normally the open upper end of the liquid container is closed by means of a cover 23 the peripheral edge of which rests upon the rubber rim 22 of the container body. In order to reduce the tendency of the outer atmosphere to raise the temperature of the contents in the container, the cover 23 is preferably provided with a jacket or lining 24 of heat insulating material. That part of the container above the lid of the ice tank is exposed so that the attendant can observe the character of the liquid in the container and also to determine when the same requires replenishing. As the level of the liquid in the container is lowered, additional liquid may be supplied thereto through the upper opening thereof upon removing the cover of the container, but without removing the container itself from the cooling tank, thereby facilitating this operation and avoiding undue interruption in the operation of the dispensing apparatus.

In order to maintain the liquid container in a central position in the ice tank while the lid 12 is removed therefrom to permit ice to be introduced into the same, centering means are provided which may be variously constructed but in their preferred form, these centering means are constructed as follows:

The numeral 25 represents an inner centering or retaining ring which surrounds the body of the liquid container within the tank and the numeral 26 represents an outer supporting ring which is secured to the upright wall of the cooling tank. These two rings are connected by means of a plurality of radial arms 27, which latter together with these rings form an open grid or spider through which ice may be freely placed in the tank.

The body of the liquid container is maintained in its centered position within the spider by means of a plurality of retaining screws 28 working in threaded openings in the inner supporting ring 25 and bearing against the periphery of the container body at different points in the circumference of the same. By tightening these screws the liquid container is maintained reliably in an upright position within the cooling tank but when it is desired to remove this container from the cooling tank for cleaning or replacing the same this can be easily done by loosening the retaining screws 28.

The means whereby the liquid is withdrawn from the neck of the container and served to a customer are constructed as follows:

The numeral 29 represents a supporting head which rests on the bottom of the cooling tank and is provided with an upwardly opening delivery chamber 30 communicating with the neck of the container and also provided with a laterally projecting spout 31 which contains a horizontal delivery passage 32 extending from the chamber 30 to a control valve mechanism at the side of the tank.

This head and spout are preferably made integrally of glass or other vitreous material so that they will not absorb liquid and can be readily cleaned. A tight joint is formed between the neck of the container and the delivery chamber 30 by means of a downwardly tapering packing sleeve 33 of rubber or the like surrounding the outer side of the neck 31 and engaging with the bore of a conical opening 34 in the upper part of the supporting head 29. At its upper end this packing sleeve is provided with a laterally projecting flange 35 which is interposed between the upper side of the supporting head 29 and the under side of the container body, which flange is gripped between these surfaces by the weight of the container and the contents thereof and thereby prevents any of the water from the melting ice in the cooling tank from mixing with the liquid flowing from the neck outwardly through the chamber 30 and passage 32.

Discharge of the liquid from the spout 31 to the exterior of the cooling tank is controlled by a valve mechanism which preferably comprises a supporting tube 36 passing through an opening in the lower part of the tank wall and receiving at its inner end the outer part of the delivery spout 31 and secured to the respective tank wall by means of a flange 37 arranged at the outer end of this tube and bearing against the outer side of the tank wall, and a clamping sleeve 38 surrounding the inner part of the supporting tube and connected therewith by means of a screw joint 39 and provided at its outer end with a flange 40 which bears against the inner side of the tank wall. The flow of liquid from this spout is controlled by a valve device comprising a valve body 41 having an inlet tube 42 on one side which is screwed into the outer part of the supporting tube 36 and a valve plug 43 rotatably mounted on the valve body and controlling the delivery passage through the same. A tight joint is formed between the supporting tube 36 and the valve body and the outer end of the liquid discharge spout 31 by a gasket 44 interposed between the same. Leakage between the liquid delivery spout 31 and the supporting tube 36 is also prevented by means of a soft washer 45 surrounding this spout and between the opposing ends of the supporting tube 36 and clamping tube 38 and a gland 46 surrounding the delivery spout. This gland is pressed against this washer by means of a screw 47 connected between this gland and the inner end of the clamping sleeve, as shown in Fig. 1.

Means are provided for conducting external air into the upper part of the container and permitting the liquid therein to be discharged downwardly therefrom through the neck and to the valve device which means are so organized that they also serve to agitate this liquid and thereby cause the solid ingredients therein to be distributed. In their preferred form these air supplying and agitating means are constructed as follows: The numeral 48 represents a vertical air tube, preferably constructed of glass or the like, and arranged centrally in the body and neck of the container and the cover applied to the upper end of the container.

The lower part of this air tube is spaced from the bore of the neck 21 and its lower open end terminates flush with the lower end of the neck, and the upper end of this air tube is open to the atmosphere. As liquid is withdrawn from the lower end of this neck air passes downwardly through the air tube and escapes from the lower end thereof and then passes upwardly through the liquid in the neck and the body of the container until it reaches the upper end of the container and takes the place of the liquid which has been withdrawn therefrom. During this upward movement of the air through the liquid in the neck and the container body, the same forms bubbles which churn or agitate the liquid and cause the solid ingredients therein to be distributed more equally throughout the entire mass of liquid.

The delivery chamber 30 and its discharge passage 32 are so constructed that when the parts are assembled the upper side of this passage is in line or flush with the lower ends of the neck 21 and the air tube 48, thereby reducing to a minimum the amount of liquid in this chamber and the discharge or delivery passage 32 between the container neck and the valve device and preventing precipitation of any substantial amount of solids in the liquid conduit between the container and the valve device and thus maintaining the beverage of uniform consistency.

Various means may be provided for mounting the air tube on the cover of the liquid container so that this tube and cover may be removed from the container and also reassembled therewith as a unit.

The preferred means for this purpose which are shown in the drawings comprise an upright supporting sleeve 49 secured in the central part of the cover 23 and receiving the upper part of the air tube. The upper end of the air tube projects above the supporting sleeve and receives a knob or handle 50 preferably of spherical form which is employed for lifting the air tube and the cover as a unit. For this purpose the upper part of the air tube is arranged in a vertical opening 51 in this knob and secured in the upper part thereof by cement 52 or the like and the lower end of this opening in the knob receives the upper part of the supporting sleeve 49 and is secured thereto by means of a screw joint 53.

Leakage of air through the joint between the handle knob and air tube and the supporting sleeve 49 to the upper part of the liquid container is prevented by means of a packing 54 of tubular form arranged in the opening 51 in the knob, between the upper end of this supporting sleeve and internal shoulder 55 in the bore of the handle knob. By these means air can only enter the top of the liquid container through the air tube, thereby insuring control of liquid from the container and obtaining the maximum agitating effect of the air which bubbles upwardly through the liquid to the top of the container.

As a whole this apparatus is very simple in construction and positively and automatically agitates the liquid in the container so as to maintain the same in a uniformly mixed condition without the use of any mechanical appliances for this purpose and also without requiring servicing by the attendant.

Moreover the several parts of this apparatus are so constructed that they can be easily taken apart and reassembled and thus permit of thoroughly easily and conveniently cleaning the apparatus and maintaining the same in a sanitary condition.

I claim as my invention:

1. A liquid dispensing apparatus comprising a liquid container having an upright cylindrical body of comparatively large diameter which is provided at its lower end with a reduced neck and has an opening in its top, a closure for the opening, an air tube arranged vertically in said body and neck and having its open upper end extending through said closure and its lower open end terminating flush with the lower end of said neck, and a discharge chamber receiving said neck and tube and having an outlet passage the upper side of which is flush with the lower ends of said neck and tube.

2. A liquid dispensing apparatus, comprising a liquid container having an upright cylindrical body which is provided at its lower end with a reduced neck and has an opening in its top extending across the entire diameter of the body, a cover which closes the opening in the upper end of the body and has its peripheral edge in removable engagement with the upper edge of the body, an upright sleeve mounted on the central part of said cover, an air tube arranged in said body, neck and sleeve, a knob secured to the upper end of said tube and having a screw connection with said sleeve and a discharge chamber receiving said neck and tube and having an outlet passage the upper side of which is flush with the lower ends of said neck and tube.

3. A liquid dispensing apparatus comprising a liquid container having an upright cylindrical body which is provided at its lower end with a reduced neck and has an opening in its top extending across the entire diameter of the body, a cover which closes the opening in the upper end of the body and has its peripheral edge in removable engagement with the upper edge of the body, an upright sleeve mounted on the central part of said cover, an air tube arranged in said body, neck and sleeve, a knob secured to the upper end of said tube and having a screw connection with said sleeve, a packing surrounding said tube between said sleeve and knob and a discharge chamber receiving said neck and tube and having an outlet passage the upper side of which is flush with the lower ends of said neck and tube.

4. A liquid dispensing apparatus, comprising an ice tank having a body which is open at its top, a lid which closes said top and is provided with an opening, an upright liquid container having a body extending through said opening so that the upper part of the same is above the tank and the lower part thereof is within the tank and having a reduced outlet neck, an upright air tube arranged within said container body and neck, centering means for maintaining the container centrally in said tank and a discharge chamber receiving said neck and tube and having an outlet passage the upper side of which is flush with the lower ends of said neck and tube.

5. A liquid dispensing apparatus, comprising an ice tank having a body which is open at its top, a lid which closes said top and is provided with an opening, an upright liquid container having a body extending through said opening so that the upper part of the same is above the tank and the lower part thereof is within the tank and having a reduced outlet neck, an upright air tube arranged within said container body and neck, centering means for maintaining the container centrally in said tank including an inner ring surrounding the body of said container, an outer ring secured to the inner side of the body of said tank, arms connecting said rings and retaining screws mounted on said inner ring and engaging the outer side of the body of said container and a discharge chamber receiving said neck and tube and having an outlet passage the upper side of which is flush with the lower ends of said neck and tube.

FRANKLIN H. KIRCHNER.

REFERENCES CITED

The following references are of record in the file of this patent:

UNITED STATES PATENTS

| Number    | Name       | Date           |
|-----------|------------|----------------|
| 89,664    | Jeanjaquet | May 4, 1869    |
| 1,719,260 | Cordley    | July 2, 1929   |
| 1,755,333 | Myers      | Apr. 22, 1930  |
| 2,173,007 | Wertheimer | Sept. 12, 1939 |